United States Patent [19]

Kim et al.

[11] 4,126,507
[45] Nov. 21, 1978

[54] TIRE-BUILDING DRUM

[76] Inventors: Vladimir A. Kim, ulitsa Uritskogo, 53, kv. 41; Jury I. Samokhvalov, ulitsa Dzerzhinskogo, 65-a, kv. 82; Boris M. Petrov, prospekt Oktyabrya, 34/21, kv. 22; Engels K. Golovkin, ulitsa Tumanova, 14-a, kv. 153; Galina N. Artamonova, ulitsa Svobody, 52/39, kv. 51, all of, Yaroslavl, U.S.S.R.

[21] Appl. No.: 785,044

[22] Filed: Apr. 6, 1977

[51] Int. Cl.² .......................................... B29H 17/16
[52] U.S. Cl. ..................................... 156/415; 156/420
[58] Field of Search ................... 156/394 R, 414, 415, 156/416, 417, 418, 419, 420

[56] References Cited
U.S. PATENT DOCUMENTS

| 3,607,558 | 3/1967 | Nebout | 156/415 |
| 3,644,162 | 2/1972 | Appleby et al. | 156/415 |
| 3,654,026 | 4/1972 | Brinkley et al. | 156/418 |
| 3,684,621 | 8/1972 | Frazier et al. | 156/415 |
| 3,778,326 | 12/1973 | Gazuit | 156/420 |
| 3,837,968 | 9/1974 | Marra | 156/420 |
| 4,010,059 | 3/1977 | Yabe | 156/420 |

Primary Examiner—John E. Kittle
Attorney, Agent, or Firm—Lackenbach, Lilling & Siegel

[57] ABSTRACT

The tire-building drum comprises alternate drum sectors with fixedly and movably mounted shoulders and mechanisms for moving said drum sectors. Each of these mechanisms consists of two parts having annular slides, which are connected to a screw drive, and levers, which are articulated to the drum sectors and the slides and which have toothed sectors arranged in constant mesh with each other for the purpose of inter-connecting the parts in each of the mechanisms for moving the drum sectors. The slides are mounted coaxially on the drum hub and are adapted to move together and separately in mutually opposite directions. This enables the drum sectors to move only radially and decreases the axial dimensions of the drum.

11 Claims, 9 Drawing Figures

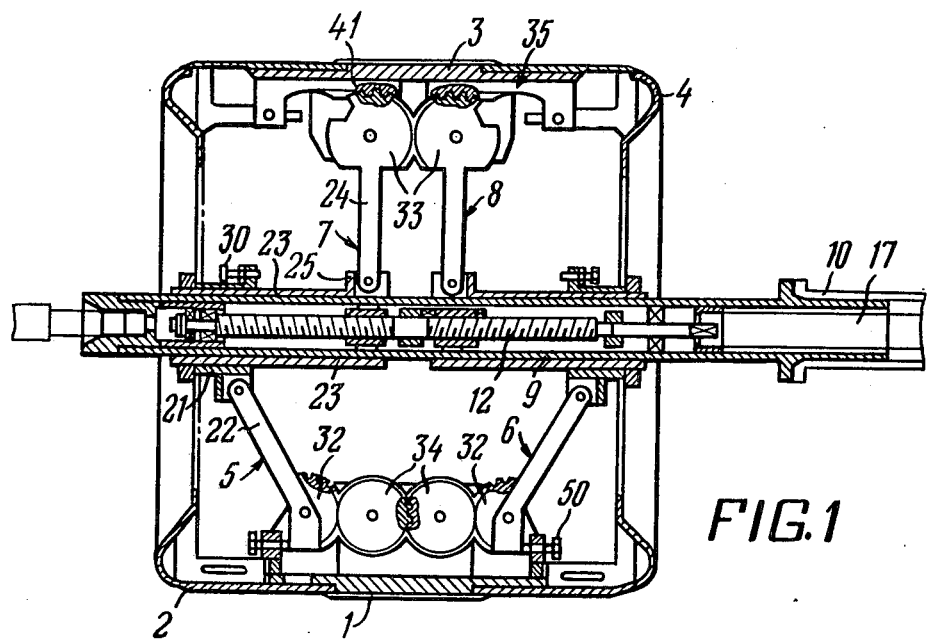
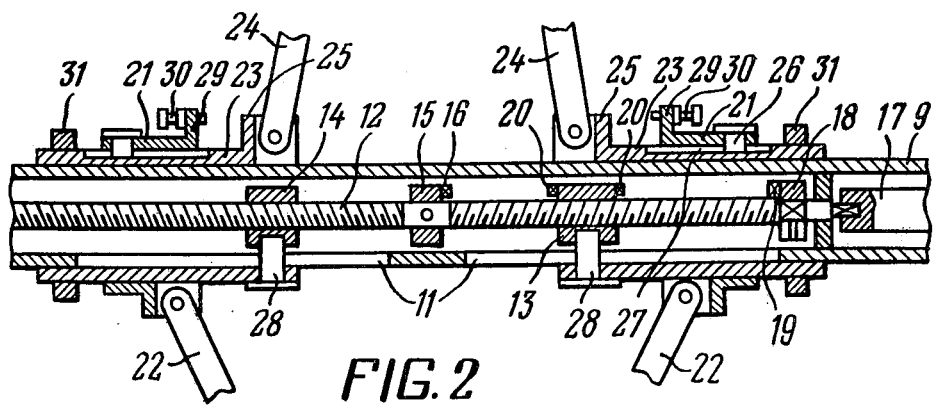

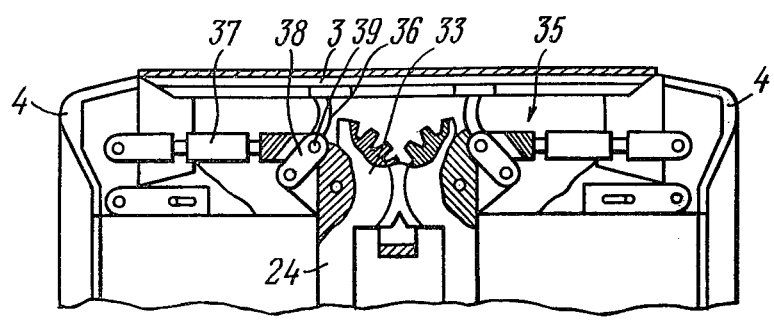
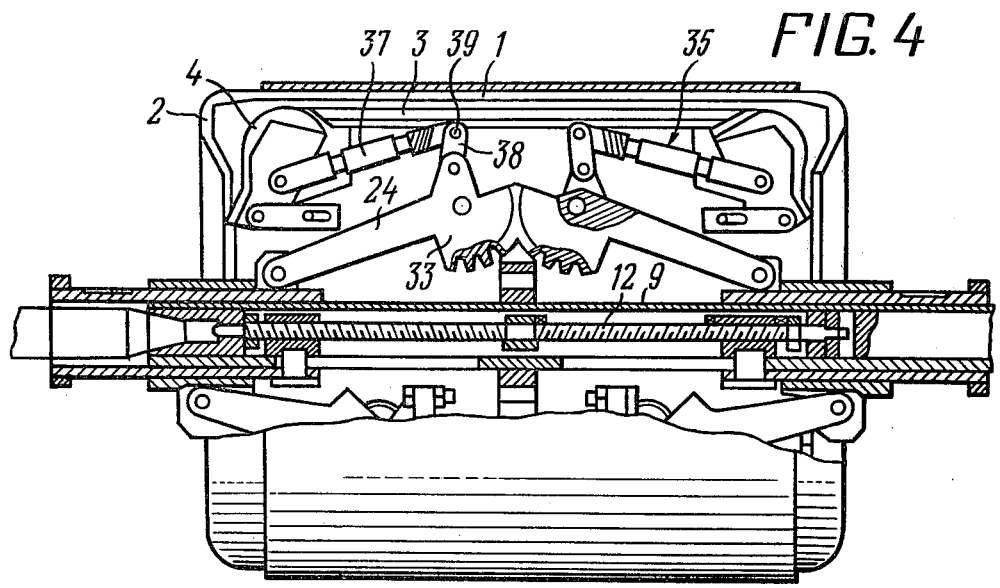

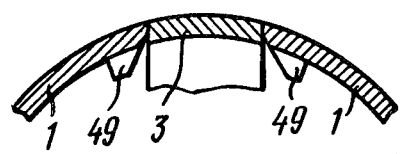
FIG. 8
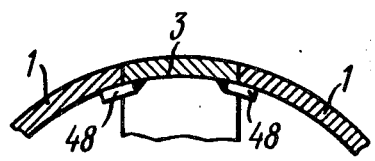
FIG. 7
FIG. 9
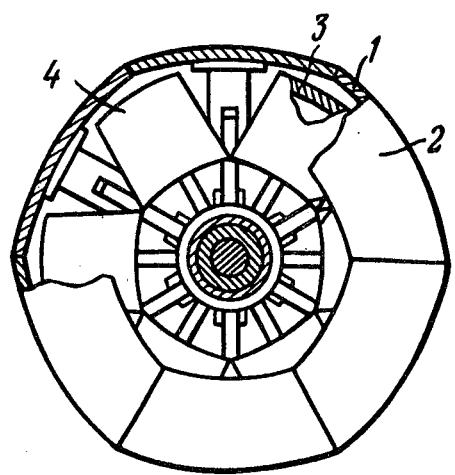

TIRE-BUILDING DRUM

FIELD OF THE INVENTION

The present invention relates to tire making machinery and, more particularly, to tire building drums. It can be used most advantageously in assembling bias tire casings and in the first stage of assembling heavy-duty radial tire casings.

BACKGROUND OF THE INVENTION

There is known in the prior art a tire building drum which comprises sectors with fixedly mounted shoulders and sectors with movably mounted shoulders. These drum sectors are arranged in a uniform alternate order and are connected by means of pivoted levers to mechanisms for moving the drum sectors and to stationary crosspieces mounted on the drum hub. Each mechanism for moving the drum sectors consists of two parts having annular slides. Said annular slides are connected to a screw drive and, by means of additional levers, to said pivoted levers. Owing to such connection, the slides of the mechanisms for moving the drum sectors move simultaneously in the same direction to either side along the shaft of the screw drive, whereby the levers are given a turning movement and the drum is caused to close or open. During such a movement of the levers the drum sectors have radial and axial motions.

Such motions of the drum sectors during the closure of the drum may possibly cause damage to the inner surface of the tire casing. Moreover, due to the axial movement of the drum sectors, the drum has considerable axial dimensions when closed and thus the overall dimensions of the whole tire-building arrangement are increased.

When closed, the drum also has a large radial dimension because of the crosspieces mounted on the drum hub and because of the fact that the movably mounted shoulders move throughout the drum closure process, which necessitates the use of specifically profiled shoulders and thereby restricts the possibility of using the drum for assembling various tire casings.

Furthermore, the pivots of the lever joints are located in the grooves provided in the drum sectors and, by reason of the clearances involved, the drum sectors become seized in the process of drum opening and so the drum sectors cannot be joined to form a whole rigid envelope. Therefore, in order to hold the drum sector fixed when the drum is open, the pivoted levers are locked by manually operating a locking device and thus automation of the tire casing assembly and removal is made impossible.

SUMMARY OF THE INVENTION

It is an object of the present invention to eliminate the disadvantages described above.

The principal object of the present invention is to provide a tire-building drum wherein the drum sectors have only a radial motion.

It is a further object of the present invention to provide a tire-building drum wherein during the process of drum closure the drum sectors move radially in succession, first the drum sectors with movably mounted shoulders and then the drum sectors with fixedly mounted shoulders.

It is a still another object of the present invention to provide a tire-building drum which has a small overall dimensions in a closed state, makes it possible to increase the range of various tire casings that can be assembled thereon, increases labor efficiency and enhances the quality of the tire casings involved.

These and other objects are achieved by a tire-building drum comprising sectors with fixedly mounted shoulders and sectors with movably mounted shoulders, said drum sectors alternating uniformly, mechanisms for moving said drum sectors are included, each of said mechanisms consisting of two parts having annular slides, which are connected to a screw drive and mounted on the hub of said drum so as to be movable lengthwise with respect to it, and levers, which are articulated to the drum sectors and the slides. According to the invention, the slides provided in said parts of the mechanisms for moving the drum sectors are coaxially mounted on the drum hub and are adapted to move together and separately in mutually opposite directions. The levers have toothed sectors arranged to be in constant mesh with each other for the purpose of interconnecting said parts in each of the mechanisms for moving the drum sectors.

This arrangement of the slides enables the parts of each mechanism for moving the drum sectors to travel at the same speed. The interconnection of the parts in each mechanism enables both the drum sectors with fixedly mounted shoulders and the drum sectors with movably shoulders to be moved only in the radial direction. This, in turn, makes it possible to decrease the axial dimensions of the drum in a closed state, as well as the dimensions of the whole tire-building arrangement, and to prevent the possibility of damaging the inner surface of the tire casing when removing the casing from the drum. Also the axial rigidity of the drum becomes greater.

The coaxial mounting of the slides and their ability to move together and separately ensure that only the drum sectors with the movably mounted shoulders travel during the initial period of drum closure. This feature excludes the possibility of the drum sectors becoming seized and ensures the necessary difference between the radial strokes of the drum sectors with movably mounted shoulders and those with fixedly mounted shoulders.

According to the invention, the drum hub has a lengthwise slot and accommodates a conventional screw drive comprising a right- and left-hand threaded screw and two nuts. By the inclusion of intermediate elements fitting through the lengthwise slot in the drum hub, the two nuts are fixedly secured to the slides incorporated in said parts of the mechanism for moving the drum sectors with movably mounted shoulders. Mounted on the screw between the nuts is an abutment which has a projection adapted to interact with a projection provided on the face of one of the nuts.

The lengthwise slot provided in the drum hub makes it possible to accommodate the screw drive inside the hub so as to give compactness to the slide driving mechanism. By the provision of the intermediate elements fitting through the length wise slot in the drum hub, the slides in each part of the mechanism for moving the drum sectors are prevented from turning relative to each other, whereby a steady position of all the drum sectors is ensured. The abutment with the projection adapted to interact with the projection on the face of one of the nuts protects against self-tightening of the screw pair at the extreme positions of the nut.

The invention is further characterized in that the slides incorporated in the parts of the mechanisms for moving the drum sectors have flange projections adapted to interact with each other when the slides move together and that the slides incorporated in the parts of the mechanism for moving the drum sectors with fixedly mounted shoulders are arranged to move axially on the slides incorporated in the parts of the mechanisms for moving the drum sectors with movably mounted shoulders.

By providing the flange projections and arranging for the slides to have a relative axial movement, the drum sectors are enabled to move in a sequence which precludes their interference (overlapping) and seizure.

The invention is still further characterized in that the flange projections on the slides incorporated in the parts of the mechanism for moving the drum sections with fixedly mounted shoulders are provided with adjusting screws.

These adjusting screws provide a means of compensating for imperfections of manufacture and wear of the movable joints, as well as a means for establishing the joining force required for the drum sections to form a whole cylindrical drum surface.

The invention is still further characterized in that the toothed sectors provided in the parts of the mechanisms for moving the drum sectors with movably mounted shoulders have mechanisms for effecting movement and dwell of said shoulders, which are connected to the shoulders and the toothed sectors.

This constructional arrangement obviates seizure of the drum sectors during the process of drum closure and provides the necessary stroke and dwell of the drum section shoulders. When the pivoted levers are moved further continuously, the dwell makes it possible to obviate limitation of the travel of the other components of the mechanisms for moving the drum sectors and over lapping of the shoulders in the drum when the drum is in a closed state, and to provide the position of the shoulders necessary for obtaining the minimum radial dimensions of the drum in a closed state.

According to one of the embodiments of this invention, each mechanism for effecting movement and dwell of the shoulders is constructed in the form of an arc-shaped groove provided in the drum sector, a link adjustable for length and articulated to the shoulder, and an intermediate link which provides an articulated connection between said link and the toothed sector and has a pin arranged to fit into the arc-shaped groove.

This constructional arrangement provides for small radial dimensions of the drum in a closed state, obviates seizure of the movably and fixedly mounted shoulders during the initial period of drum closure and, with the pivoted levers moving further continuously, effects dwell of the movably mounted shoulders by virtue of the pin fitted in the arc-shaped groove. The link adjustable for length enables setting of the width of the drum to suit the size of the tire casings involved.

In another embodiment of the present invention, each mechanism for effecting movement and dwell of the shoulders is constructed in the form of a link and a toothed rack which are articulated to each other. The link is adjustable for length and said toothed rack has an arc-shaped recess and is in mesh with the toothed sector, which has a projection congruent with the arc-shaped recess in the toothed rack. This construction gives compactness to the drum sectors with the movably mounted shoulders.

It is desirable that the arc-shaped recesses in the toothed racks and the corresponding projections on the toothed sectors be located at different distances from the centers of the respective toothed sectors, as measured along the axis of the drum. By this arrangement the shoulders are given different strokes so as to preclude overlapping of the shoulders on adjacent drum sectors during drum closure. This also obviates seizure of the drum sectors and makes it possible to avoid cutouts in the shoulders with a consequent improvement of the quality of the tire casing assembly.

The present invention is still further characterized in that the adjacent drum sectors with fixedly and movably mounted shoulders are interconnected on the inner side by means of pivoted links. This construction permits the drum sectors with fixedly mounted shoulders to be located axially with respect to the drum sectors with movably mounted shoulders and thereby obviates overlapping of the shoulders and seizure of the drum sectors.

The invention is still further characterized in that the drum sectors with movably mounted shoulders are provided with abutments adapted to contact adjacent drum sectors when the drum is in an open state and that the drum sectors with fixedly mounted shoulders are provided with inclined guides between which said abutments are located. When the drum is opened, the sectors are locked by the abutments, thus forming a whole cylindrical envelope, the rigidity of the structure is increased and the working load is taken up by all the sectors. The inclined guides provided on the drum sectors with fixedly mounted shoulders orientate the radial position of the drum sectors with movably mounted shoulders, thereby eliminating the influence of wear on the joints of the pivoted levers on the relative radial position of the drum sectors and, consequently, extending the service life of the drum.

It is desirable that idler gears be provided between the toothed sectors relating to the drum sectors with fixedly mounted shoulders.

Thus, the tire-building drum constituting the present invention has a greater closure coefficient and has no removable sector shoulders. When the drum is closed, its shape approximates a cylinder, the diameter of which is smaller than the tire bead diameter. This provides elimination of hand labor, employment of mechanized and automated methods of removing assembled tire casings, and at the same time, enhancement of the quality of tire assembly and an increase in the working efficiency.

The drum consists of sectors similar in construction with features readily manufacturable and of a labor saving design. The provision for adjustment enables the drum to function for a long time without repairs. The drum can be used for assembling a wide range of tire casings, in particular those of a heavy-duty type.

Now the invention will be described in detail with reference to the accompanying drawings.

DESCRIPTION OF THE DRAWINGS

FIG. 1 is a longitudinal sectional view of the tire-building drum constructed in accordance with the invention.

FIG. 2 is an enlarged longitudinal sectional view of the drum hub and the screw drive.

FIG. 3 shows is an enlarged sectional view showing an embodiment of the mechanism for effecting movement and dwell of the drum section shoulders.

FIG. 4 is an enlarged fragmentary longitudinal sectional view of the drum in a closed state.

FIG. 7 is an enlarged sectional view showing the position of the drum sectors with the drum open.

FIG. 8 is a view similar to that in FIG. 7, but showing the section through the abutments.

FIG. 9 is a side elevational view of the drum in a closed state.

DESCRIPTION OF THE INVENTION

Figure 5:
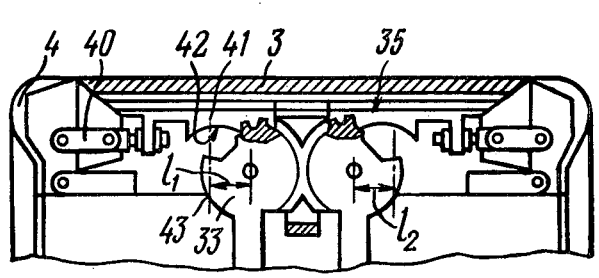
FIG. 5 shows another embodiment of the mechanism for effecting movement and dwell of the drum section shoulders.

The tire-building drum constituting the present invention comprises drum sectors 1 (FIG. 1) with fixedly mounted shoulders 2 and drum sectors 3 with movably mounted shoulders 4, said drum sectors alternating uniformly; a mechanism for moving the drum sectors 1 with fixedly mounted shoulders 2, which consists of two similar parts 5 and 6; a mechanism for moving the drum sectors 3 with movably mounted shoulders 4, which consists of two similar parts 7 and 8; and a drum hub 9 constructed in the form of a hollow shaft and connected to a hollow driving shaft 10 (drawn in thin lines).

The drum hub 9 (FIG. 2) has a lengthwise slot 11 and accommodates a conventional screw drive comprising a right- and left-hand threaded screw 12 and two nuts 13 and 14 which are also threaded right- and left-hand. Mounted on the screw 12 between the nuts 13 and 14 is an abutment 15 having a projection 16. The screw 12 has a rectangular tailpiece connected to a driving shaft 17 which passes through the hub 9 and the hollow driving shaft 10 (FIG. 1). An abutment 18 having a projection 19 is secured on the tailpiece of the screw 12 (FIG. 2). The nut 13 has projections 20 provided on each of its endfaces, which are adapted to interact with the projection 16 on the abutment 15 and with the projection 19 on the abutment 18.

Each of the parts 5 and 6 (FIG. 1) of the mechanism for moving the drum sectors 1 comprises an annular slide 21 and levers 22, the ends of which are articulated to the drum sectors 1 and the slide 21.

Each of the parts 7 and 8 of the mechanism for moving the drum sectors 3 comprises an annular slide 23 and levers 24, the ends of which are articulated to the drum sectors 3 and the slide 23.

The slides 21 and 23 in the parts 5 and 7, the same as the identically numbered slides in the parts 6 and 8 of the mechanisms for moving the drum sectors 1 and 3, are coaxially mounted on the drum hub 9 and are adapted to move together and separately, said slides 21 and 23 in the parts 5 and 7 and said identically numbered slides in the parts 6 and 8 being adapted to move on the hub in mutually opposite directions.

To effect this movement, the slides 23 are constructed in the form of cylinders having projections 25 to which the levers 24, are articulated said cylinders being mounted direct on the hub 9 as shown in FIGS. 1 and 2.

The slides 21 are mounted on the slides 23 and are held thereon by means of projections 26 (FIG. 2) which fit into lengthwise grooves 27 provided in the slides 23, thereby enabling the slides 21 to move axially along the slides 23.

The slide 23 of the part 7 is fixedly connected to the nut 14 through an intermediate element 28, for example, a key fitting through the lengthwise slot 11 in the hub 9. The slide 23 of the part 8 is fixedly connected to the nut 13 through an identical intermediate element 28. Therefore, rotation of the screw 12 causes the slides to move in mutually opposite directions. For the slides 21 and 23 to move together the slides 21 have flange projections 29 with an adjusting screw 30 and the slides 23 have flange projections 31 which can be made in the form of nuts. The end of the slide 21 interacts with the flange projection 31 and the screw 30 provided in the projection 29 interacts with the projection 25 on the slide 23.

The parts in each of the mechanisms for moving the drum sectors are interconnected by means of toothed sectors provided on the levers 22 and 24. Thus, the levers 22 in the parts 5 and 6 of the mechanism for moving the drum sectors 1 have toothed sectors or gears in constant mesh with each other. The levers 24 in the parts 7 and 8 of the mechanism for moving the drum sectors 3 have toothed sectors or gears 33 in constant mesh with each other. Idler gears 34 are provided between the toothed gears 32 incorporated in the parts 5 and 6. The toothed gear 33 incorporated in the parts 7 and 8 of the mechanism for moving the drum sectors 3 with movable mounted shoulders 4 have mechanisms 35 for effecting movement and dwell of said shoulders 4. The mechanisms 35 are connected with the shoulders 4 and the toothed sectors 33.

Each mechanism 35 (FIGS. 3 and 4) is constructed in the form of an arc-shaped groove 36 provided in the drum sector 3, a link 37, and an intermediate link 38, for example, a plate articulated to the link 37 and the toothed gear 33 and having a pin 39 arranged to fit in the arc-shaped groove 36. The link 37 is adjustable in length, i.e. of telescopic construction, and is articulated to the shoulder 4 of the drum sector 3.

The mechanisms 35 for effecting movement and dwell of the shoulders 4 may be constructed according to another embodiment of the invention, as shown in FIG. 5.

Referring to FIG. 5, each mechanism 35 is constructed in the form of a link 40 and a toothed rack 41 which are articulated to each other. The link 40 is adjustable in length, i.e. of telescopic construction, and is articulated to the shoulder 4 of the drum sector 3. The toothed rack 41 has an arc-shaped recess 42 and is in constant mesh with the toothed gear 33 which has a projection 43 congruent with the arc-shaped recess 42 in the toothed rack 41.

The mechanism 35 may be constructed (FIG. 1) so that the shoulder is secured to the rack 41.

For the invention to be carried into effect most successfully, the arc-shaped recesses 42 in the toothed racks 41 and the corresponding projections 43 on the toothed gears 33 are located at different distances $l_1$ and $l_2$, from the centers of the respective toothed gears 33, as measured along the axis of the drum.

Figure 6:
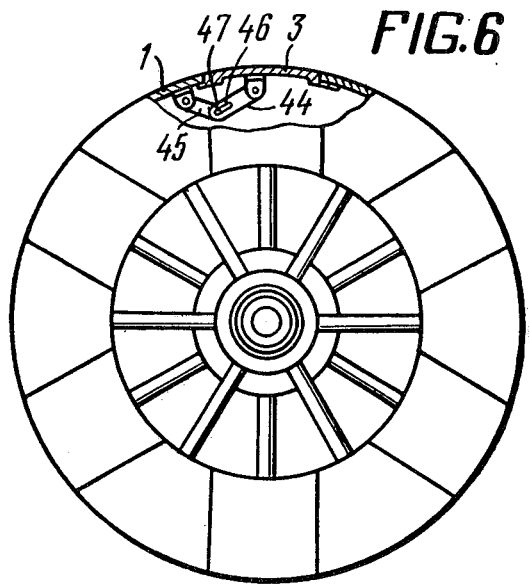
FIG. 6 is a side elevational view of the drum in an open state, with a portion partially broken away.

Adjacent drum sectors 1 and 3 (FIG. 6) are interconnected on the inward side by means of pivoted links 44 and 45. For the purpose of connecting the links and permitting them to pivot relative to each other, the link 44 is provided with a slot 46 into which a pin 47 provided on the link 45 fits.

To give rigidity to the drum in an open state, the drum sectors 3 (FIG. 7) with movably mounted shoulders are provided with abutments 48 adapted to contact adjacent drum sectors 1 when the drum is in an open state and the drum sectors 1 are provided with inclined guides 49 between which are located the abutments 48. Besides, the drum sectors 1 (FIG. 1) are provided with adjusting abutments 50 adapted to contact the levers 22 when the drum is in an open state.

For normal functioning of the drum, the drum should be provided with any braking device known in the art.

The drum operates as follows:

After the tire casing has been built on the drum by a method known in the art, the hub 9 (FIG. 2) is braked. The shaft 17, rotating together with the screw 12, moves the nuts 13 and 14 in mutually opposite directions, away the aabutment 15. The nuts 13 and 14 move in these directions the slides 23 incorporated in the parts 7 and 8, thereby causing the levers 24 to turn and thus to move the drum sectors 3 radially, i.e. toward the hub 9. It will be noted that the slides 23 move on the hub 9, whereas the slides 21 remain stationary with respect to the slides 23.

As the levers 24 move, the toothed gears 33 turn and move the links 37 as shown in FIG. 4 or, according to another embodiment (FIG. 5), interact with the toothed racks 41 and the link 37 or racks 41 turn the movably mounted shoulders 4 inward. After the toothed racks 41 unmesh from the toothed gears 33, the arc-shaped projections 43 provided thereon enter the arc-shaped recesses 42 in the toothed racks 41. In this way the toothed racks 41 and, consequently, the shoulders 4 are caused to dwell during the further process of drum closure.

After the shoulders 4 have been moved inward, the slides 21 (FIG. 2) start moving due to the fact that the projections 25 on the slides 23 abut against the screws 30 fitted in the slides 21. The movement of the slides 21 causes the levers 22 to turn and thus to move the drum sectors 1 radially, i.e., toward the drum hub. During this period, up to the end of drum closure, the slides 21 and 23 move simultaneously and, consequently, the drum sectors 1 and 3 also move radially inward simultaneously.

When the drum is in a closed state as shown in FIG. 9, the drum sectors 1 and 3 are locked in position by the abutment 18 (FIG. 2) whose face projection 19 contacts the projection 20 provided on the face of the nut 13. Apart from the locking action, this arrangement protects against self-tightening of the nuts 13 and 14 on the screw 12.

When the drum is in a closed state, its diameter is smaller than the bead diameter of the assembled tire casing and, therefore, the casing can be easily removed from the drum.

The drum is opened in a reverse manner from that used for closure. When the drum is in an open state, the drum sectors 1 and 3 are locked in position by the abutments 48 (FIG. 7), the adjustable abutments 50 (FIG. 1) and the abutment 15 whose face projection 16 contacts the projection 20 provided on the face of the nut 13 and thereby prevents self-tightening of the screw pair during the drum opening process.

To obtain the drum parameters required in service, the stroke of the slides 21 along the slides 23 is adjusted by the use of the adjusting screws 30 and by varying the position of the projection 31, and the stroke of the slide 23 is adjusted by relocating the abutment 18 and securing it in position with the screw.

This constructional arrangement provides for establishment of the required position of the drum sectors 1 and 3 with the drum closed and open, respectively, and for offsetting wear of the movable connections and imperfections of manufacture.

During the process of opening the drum the abutments 48 (FIG. 7) of the drum sectors 3 become located between the inclined guides 49 (FIG. 8). When the drum is open, the drum sectors 1 (FIG. 7), bearing upon the abutments 48, form a rigid structure, which is conductive a high-quality manufacture of tire casings.

What we claim is:

1. A tire-building drm comprising: drum sectors with fixedly mounted shoulders; drum sectors with movably mounted shoulders, said drum sectors with movably mounted shoulders being uniformly located between said drum sectors with fixedly mounted shoulders; a drum hub; a screw drive; a mechanism for radially moving said drum sectors with fixedly mounted shoulders and a mechanism for radially moving said drum sectors with movably mounted shoulders, each of said mechanisms for moving the drum sectors with fixedly and movably mounted shoulders consisting of two parts, each of which has annular slides which are connected to said screw drive and levers which are articulated to corresponding drum sectors and slides, the slides incorporated in the parts of said mechanisms being coaxially mounted on said drum hub to move together and separately on the hub in mutually opposite directions; and toothed gears provided on the levers incorporated in the parts of said mechanisms for moving said drum sectors are arranged to be in constant mesh with each other for interconnecting said parts in each of the mechanisms for moving the drum sectors.

2. A tire-building drum as claimed in claim 1, wherein the drum hub has a lengthwise slot and accommodates a conventional screw drive comprising a right- and left-hand threaded screw and two nuts which, by means of intermediate elements fitting through the lengthwise slot in the drum hub, are fixedly secured to the slides incorporated in the parts of the mechanism for moving the drum sectors with movably mounted shoulders, an abutment being mounted on the screw between the nuts, which has a projection which can interact with a projection provided on the face of one of the nuts.

3. A tire-building drum as claimed in claim 2, wherein the slides incorporated in the parts of the mechanisms for moving the drum sectors have flange projections to interact with each other when the slides move together, and the slides incorporated in the parts of the mechanism for moving the drum sectors with fixedly mounted shoulders are arranged to move axially along the slides incorporated in the parts of the mechanisms for moving the drum sectors with movably mounted shoulders.

4. A tire-building drum as claimed in claim 3, wherein the flange projections on the slides incorporated in the parts of the mechanism for moving the drum sections with fixedly mounted shoulders are provided with adjusting screws.

5. A tire-building drum as claimed in claim 1, wherein the toothed gears incorporated in the parts of the mechanism for moving the drum sectors with movably mounted shoulders have mechanisms for effecting movement and dwell of said shoulders, which are connected to the shoulders and the toothed gears.

6. A tire-building drum as claimed in claim 5, wherein each mechanism for effecting movement and dwell of the shoulders is constructed of an arc-shaped groove provided in the drum sector, a link adjustable in length and articulated to the shoulders, and an intermediate link which provides an articulated connection between said link and the toothed gear and has a pin arranged to fit in the arc-shaped groove.

7. A tire-building drum as claimed in claim 5, wherein each mechanism for effecting movement and dwell of the shoulders is constructed of a link and a toothed rack which are articulated to each other, said link being adjustable in length and said toothed rack having an arc-shaped recess and being in mesh with the toothed gear, the toothed gear having a projection congruent with the arc-shaped recess in the toothed rack.

8. A tire-building drum as claimed in claim 7, wherein the arc-shaped recesses in the toothed racks and the corresponding projections on the toothed gears are located at different distances from the centers of the respective toothed sectors, as measured along the axis of the drum.

9. A tire-building drum a claimed in claim 1, wherein adjacent drum sectors with fixedly and movably mounted shoulders are interconnected on the inward side by means of pivoted links.

10. A tire-building drum as claimed in claim 1, wherein the drum sectors with movably mounted shoulders are provided with abutments adapted to contact adjacent drum sectors when the drum is in an open state, and the drum sectors with fixedly mounted shoulders are provided with inclined guides between which are located the abutments.

11. A tire-building drum as claimed in claim 1, wherein idler gears are provided between the toothed gear relating to the drum sectors with fixedly mounted shoulders.

* * * * *